(12) United States Patent
Kadowaki

(10) Patent No.: US 11,782,530 B2
(45) Date of Patent: *Oct. 10, 2023

(54) TOUCH PAD AND COMPUTER

(71) Applicant: Wacom Co., Ltd., Saitama (JP)

(72) Inventor: Jun Kadowaki, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/895,608

(22) Filed: Aug. 25, 2022

(65) Prior Publication Data

US 2022/0404922 A1 Dec. 22, 2022

Related U.S. Application Data

(63) Continuation of application No. 17/388,947, filed on Jul. 29, 2021, now Pat. No. 11,460,934, which is a continuation of application No. PCT/JP2019/010104, filed on Mar. 12, 2019.

(51) Int. Cl.
G06F 3/0354 (2013.01)
G06F 3/044 (2006.01)

(52) U.S. Cl.
CPC ...... *G06F 3/03547* (2013.01); *G06F 3/03545* (2013.01); *G06F 3/0446* (2019.05); *G06F 2203/04105* (2013.01)

(58) Field of Classification Search
CPC .......... G06F 3/03545; G06F 3/03547; G06F 3/0446; G06F 2203/04105
See application file for complete search history.

(56) References Cited

U.S. PATENT DOCUMENTS

| 9,176,634 | B2 | 11/2015 | Yamamoto |
| 9,207,801 | B2 | 12/2015 | Schediwy et al. |
| 10,146,313 | B2 | 12/2018 | Fujii et al. |
| 2011/0141052 | A1 | 6/2011 | Bernstein et al. |
| 2015/0009177 | A1 | 1/2015 | Yamamoto |
| 2018/0067556 | A1 | 3/2018 | Fujii et al. |

FOREIGN PATENT DOCUMENTS

| JP | 2007-094808 A | 4/2007 |
| JP | 2007-249439 A | 9/2007 |
| JP | 2015-170046 A | 9/2015 |
| JP | 2017-059066 A | 3/2017 |
| JP | 2018-041241 A | 3/2018 |
| WO | 2013/088559 A1 | 6/2013 |

OTHER PUBLICATIONS

International Search Report, dated Jun. 11, 2019, for International Application No. PCT/JP2019/010104, 2 pages.

*Primary Examiner* — Michael Pervan
(74) *Attorney, Agent, or Firm* — Seed IP Law Group LLP

(57) ABSTRACT

A touch pad is configured to receive input operations using objects including a finger and a stylus. The touch pad includes a touch screen including a touch detection surface that serves as a button and as a position detection region for detecting positions of the objects. The touch pad includes an integrated circuit having an object detection function of detecting the positions of the objects on the touch detection surface and a button function of detecting a press state of the button based on a force applied to the touch detection surface. The touch pad includes a button function stop unit configured to cause, according to an operation state of the stylus or according to a setting related to an input operation of the stylus, the integrated circuit to stop outputting a button press state value indicative of the press state detected by the button function.

20 Claims, 11 Drawing Sheets

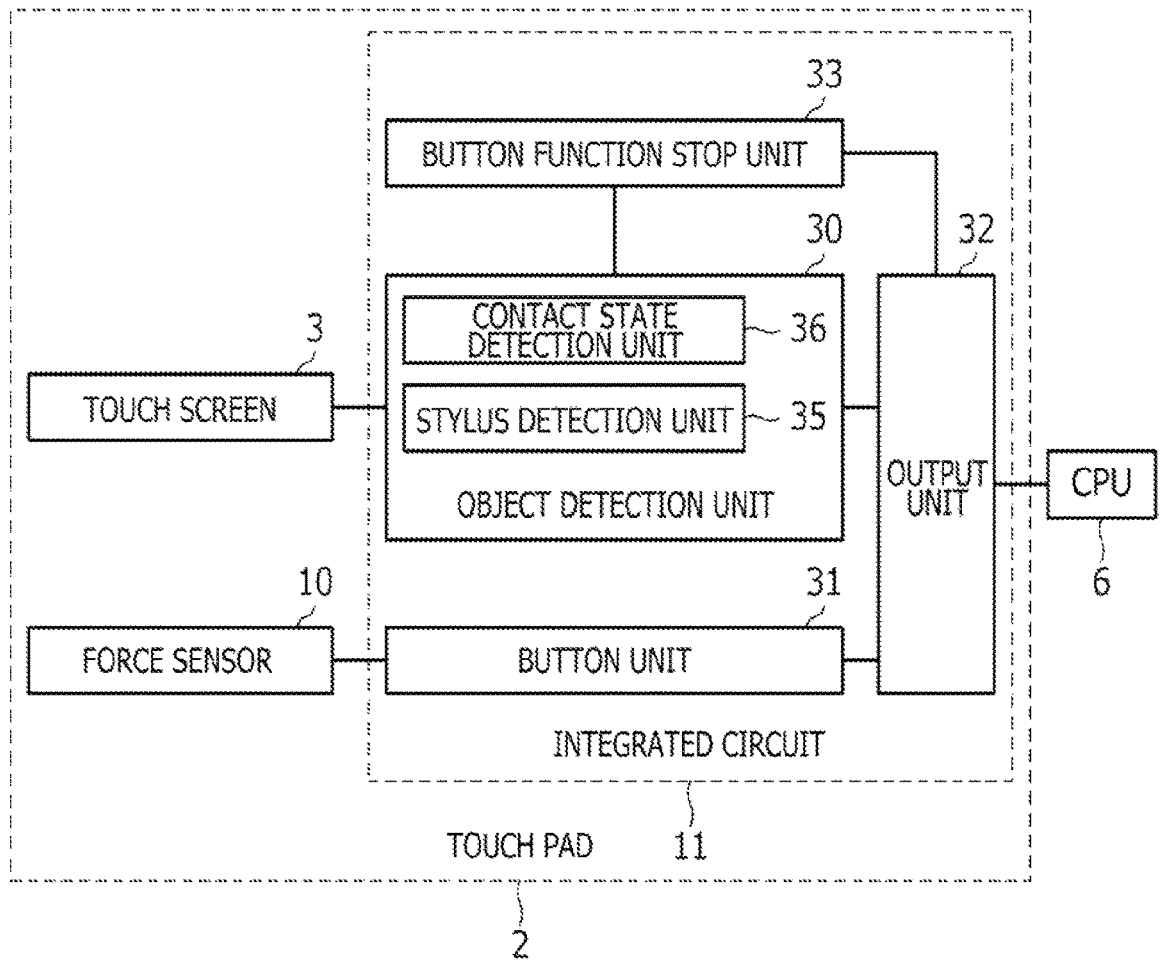

TOUCH PAD AND COMPUTER

BACKGROUND

Technical Field

The present disclosure relates to a non-discrete type touch pad and a computer including such a touch pad.

Description of the Related Art

A touch pad or a track pad (collectively referred to as a "touch pad") provided on a notebook computer or the like generally includes a button or a button function for realizing a function equivalent to a right click or left click function of a mouse device. The touch pad is classified into a discrete type or a non-discrete type depending on whether or not the touch screen system is provided separately from the button system.

FIG. 13A depicts a notebook computer 100a including a discrete type touch pad 200a. As illustrated in FIG. 13A, the touch pad 200a of this type includes dedicated buttons 202 and 203 for a click operation realized by a separate system from a touch screen 201.

On the other hand, FIG. 13B depicts a notebook computer 100b including a non-discrete type touch pad 200b. As illustrated in FIG. 13B, the touch pad 200b of this type does not include dedicated buttons for a click operation, and the click operation is realized by pressing a touch screen 204.

The non-discrete type touch pad 200b can be further divided into two types, which are a "click pad" type and a "pressure pad" type, based on the specific structure used to press the touch screen 204 to realize a click. The click pad is a type of touch pad in which the touch screen 204 pressed by a user is displaced downward. In many cases, the click pad includes a push button switch just below the touch screen 204. The touch screen 204 displaced downward turns on the push button switch to realize the click operation in the click pad. On the other hand, the pressure pad is a type of touch pad, in which a force sensor detects the press force applied to the touch screen 204, and the output of the force sensor is compared with a threshold to realize the click. In the pressure pad, the touch screen 204 may be slightly bent, but the touch screen 204 is not displaced as much as in the click pad.

The three types of touch pads described above (discrete type, non-discrete click pad type, and non-discrete pressure pad type) and the content of a report supplied from these touch pads to a host device are disclosed in "Windows Precision Touchpad Collection," [online], May 2, 2017, by Eliot Graff and three others, Microsoft Corporation, [searched on Mar. 5, 2019], Internet <URL: https://docs.microsoft.com/en-us/windows-hardware/design/component-guidelines/touchpad-windows-precision-touchpad-collection>. Further, a specific reporting method of the press state of buttons realized by the touch pad is disclosed in "Buttons, Report Level Usages," [online], May 2, 2017, by Eliot Graff and three others, Microsoft Corporation, [searched on Mar. 5, 2019], Internet <URL: https://docs.microsoft.com/en-us/windows-hardware/design/component-guidelines/touchpad-buttons-report-level-usages>.

Examples of the mechanism for realizing the touch pad are disclosed in U.S. Pat. No. 9,207,801 (hereinafter, referred to as Patent Document 1) and U.S. Patent Application Publication No. 2011/0141052 (hereinafter, referred to as Patent Document 2). The touch pad described in Patent Document 1 is displaced downward, and the touch pad can be called a click pad. However, the touch pad described in Patent Document 1 includes a force sensor instead of a push button switch. The touch pad described in Patent Document 2 is a pressure pad in which the touch pad is not displaced. However, to provide a sense of clicking, the touch pad described in Patent Document 2 has a function of slightly moving the entire touch pad horizontally in response to the detection of a click.

BRIEF SUMMARY

The touch pad is originally provided to receive an operation input by a finger. It would be convenient for a user if the touch pad can also receive an operation input by a stylus. For example, a region in the touch pad can be used as a region for receiving a signature inputted by a stylus. Therefore, the inventor of the present specification has been developing touch pads that can additionally receive an operation input by a stylus. The inventor has discovered that the following problem occurs in relation to the non-discrete type touch pads.

Specifically, in both the click pad type touch pad and the pressure pad type touch pad, a threshold related to a press force (a pressure applied to a touch detection surface) as a condition to trigger button actuation is optimized to provide the best experience when the touch screen is pressed by a finger. When the user uses a stylus on the touch pad, the user tends to apply the same force to the stylus pen tip to perform handwriting as the pen pressure applied when writing on a piece of paper using a pen. As a result, an unintended click operation may occur when the user uses a stylus to perform an input operation.

In addition, the touch screen is displaced when the user uses a stylus to perform the input operation, particularly in the click pad type non-discrete touch pad. As a result, the user's handwriting operation may be disturbed when the pressure applied to the stylus pen tip abruptly changes, or the pen pressure values detected in the stylus may become discontinuous.

Therefore, an aspect of the present disclosure is directed to providing a touch pad and a computer that can prevent generation of a click operation not intended by a user when the user uses a stylus to make an input in a non-discrete type touch pad.

Another aspect of the present disclosure is directed to providing a touch pad and a computer that can prevent disturbance to handwriting and generation of discontinuous pen pressure values caused by physical displacement of a touch screen when a user uses a stylus to make an input in a click pad.

A first aspect of the present disclosure provides a non-discrete type touch pad which can receive input operations using objects including both a finger and a stylus. The touch pad includes a touch screen including a touch detection surface that serves both as a button and as a position detection region for detecting positions of the objects. The touch pad includes an integrated circuit having an object detection function of detecting the positions of the objects on the touch detection surface and a button function of detecting a press state of the button based on a force applied to the touch detection surface. The touch pad (or the integrated circuit) includes a button function stop unit configured to cause, according to an operation state of the stylus or according to a setting related to an input operation of the stylus, the integrated circuit to stop outputting a button press state value indicative of the press state detected by the button function.

The touch pad according to the first aspect of the present disclosure may be a non-discrete type touch pad which can receive input operations using objects including a finger and a stylus. The touch pad includes a touch detection surface that serves both as a button and as a position detection region for detecting positions of the objects. The touch pad includes an integrated circuit having an object detection function of detecting the positions of the objects on the touch detection surface and a button function of detecting a press state of the button based on a force applied to the touch detection surface. The touch pad (or the integrated circuit) includes a button function stop unit configured to cause, according to an operation state of the stylus or according to a setting related to an input operation of the stylus, the integrated circuit to stop outputting a button press state value indicative of the press state detected by the button function.

A second aspect of the present disclosure provides a touch pad according to the first aspect of the present disclosure, in which the touch screen is displaced according to the force applied to the touch detection surface, and the button function stop unit is a displacement suppression unit configured to suppress the displacement of the touch screen.

According to the first aspect of the present disclosure, outputting of the button press state value from the integrated circuit can be stopped when the user uses the stylus to perform the input operation. This can prevent generation of a click operation not intended by the user when the user uses the stylus to make an input in the non-discrete type touch pad.

According to the second aspect of the present disclosure, the displacement of the click pad can be suppressed when the user uses the stylus to perform the input operation. This can prevent disturbance to handwriting and generation of discontinuous pen pressure values caused by physical displacement of the touch screen when the user uses the stylus to make an input in the click pad.

BRIEF DESCRIPTION OF THE SEVERAL VIEWS OF THE DRAWINGS

FIG. 3 is a schematic block diagram illustrating functional blocks of an integrated circuit according to the first embodiment of the present disclosure;

FIG. 4 depicts a configuration of data supplied from an output unit to a central processing unit (CPU);

DETAILED DESCRIPTION

Embodiments of the present disclosure will now be described in detail with reference to the attached drawings.

Figure 1:
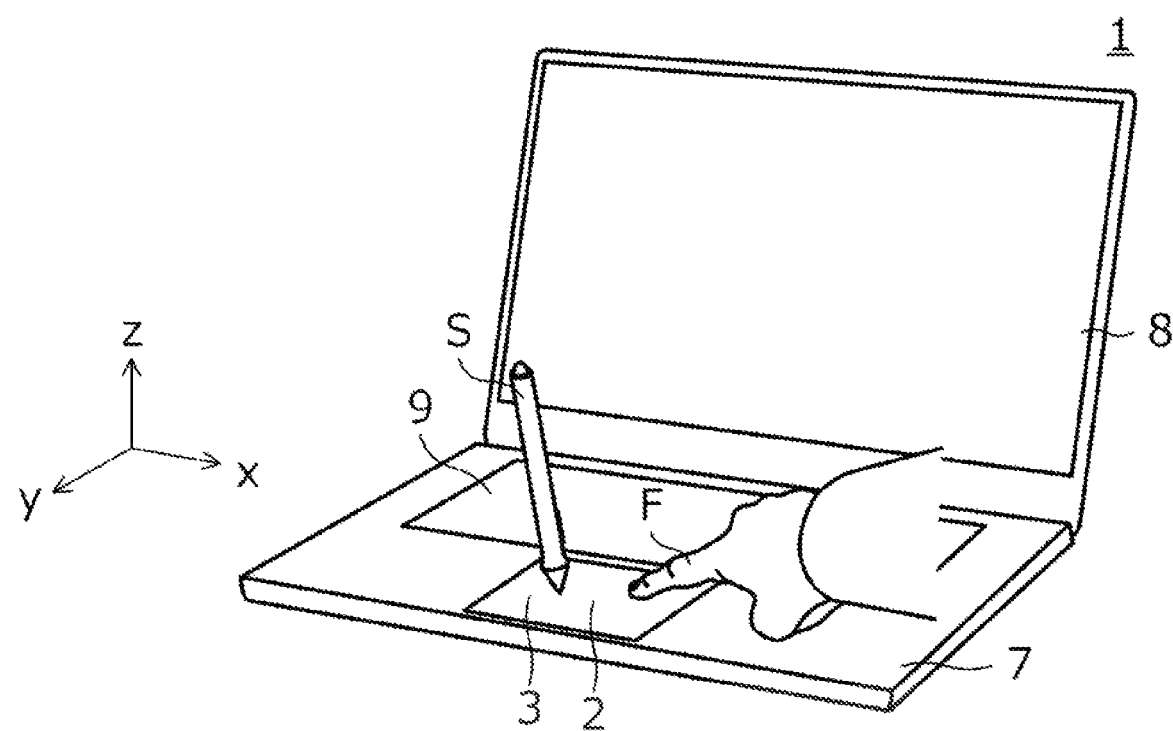
FIG. 1 depicts a notebook computer including a non-discrete type touch pad according to a first embodiment of the present disclosure.

FIG. 1 depicts a notebook computer 1 including a non-discrete type touch pad 2 according to a first embodiment of the present disclosure. Besides the touch pad 2, the notebook computer 1 includes various components typically included in a commercially available notebook computer, such as a housing 7, a display 8, and a keyboard 9 illustrated in FIG. 1, and a CPU 6 illustrated in FIG. 2A to be described later. In the following description, a direction corresponding to a lateral direction as viewed from the user using the notebook computer 1 will be referred to as an x-direction as illustrated in FIG. 1. A direction corresponding to a depth direction will be referred to as a y-direction, and a direction corresponding to a height direction will be referred to as a z-direction.

Figure 2A:
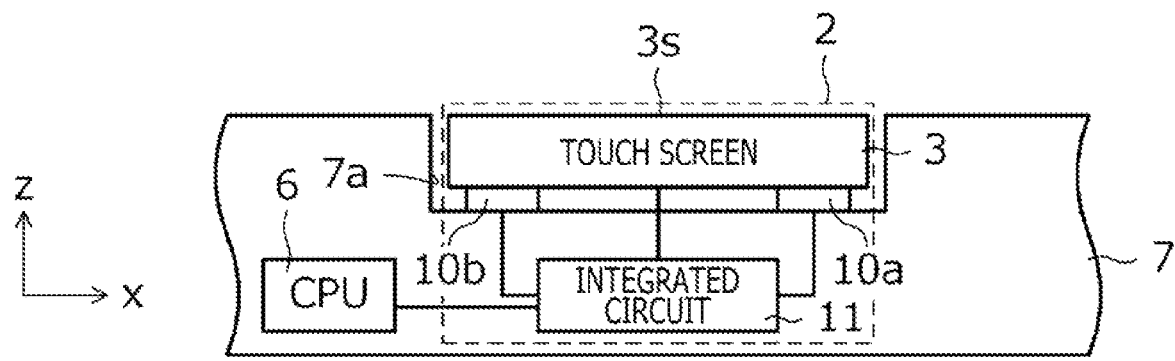
FIG. 2A depicts a y-direction cross section of the notebook computer near the touch pad 2 according to the first embodiment of the present disclosure.
Figure 2B:
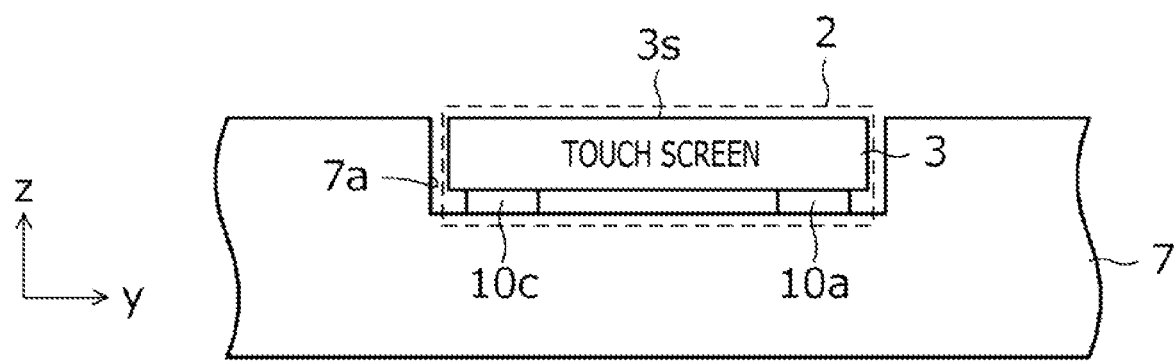
FIG. 2B depicts an x-direction cross section of the notebook computer 1 near the touch pad 2 according to the first embodiment of the present disclosure.
Figure 2C:
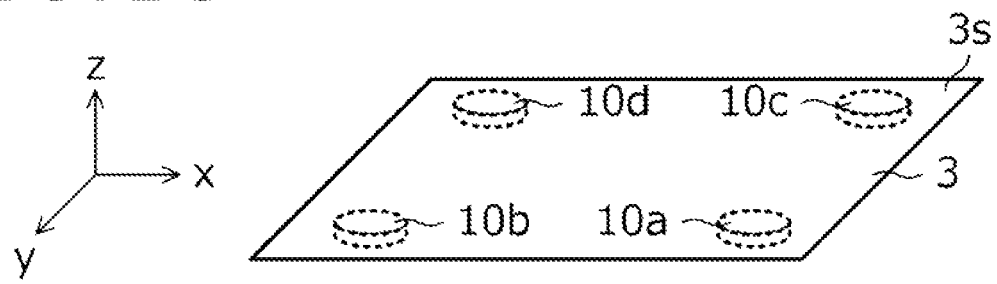
FIG. 2C depicts a positional relation, on a plane, between a touch screen and four force sensors included in the touch pad according to the first embodiment of the present disclosure.

FIG. 2A depicts a y-direction cross section of the notebook computer 1 near (adjacent to) the touch pad 2, and FIG. 2B depicts an x-direction cross section of the notebook computer 1 near the touch pad 2. FIG. 2C depicts a positional relation, on a plane, among a touch screen 3 and four force sensors 10a to 10d included in the touch pad 2. Although the CPU 6 and an integrated circuit 11 illustrated in FIG. 2A are structures that may not actually appear in the cross section, the structures are illustrated to help understanding of the configuration of the touch pad 2.

As illustrated in FIG. 2A, the notebook computer 1 includes the CPU 6 (a host computer). The CPU 6 is a central processing unit of the notebook computer 1. The CPU 6 can execute the operating system of the notebook computer 1, various applications, driver software of various types of hardware including the touch pad 2, and the like in cooperation with a storage apparatus (not illustrated). The CPU 6 also executes a process of receiving input from various input apparatuses including the touch pad 2 and the keyboard 9 illustrated in FIG. 1, a process of outputting execution results of the operating system and various applications to various output apparatuses including the display 8 illustrated in FIG. 1, a process of communicating with other computers through a communication unit (not illustrated), and the like.

The touch pad 2 is a pressure pad as described above. As illustrated in FIGS. 2A to 2C, the touch pad 2 includes the touch screen 3, the four force sensors 10a to 10d, and the integrated circuit 11. In the following description, the force sensors 10a to 10d will be collectively referred to as force sensor(s) 10 in some cases when the force sensors 10a to 10d do not have to be particularly distinguished from each other.

The touch screen 3 is a touch screen supportive of a capacitance system. Examples of a specific configuration of the touch screen 3 that can be suitably adopted include a configuration in which a plurality of linear electrodes (referred to as "X-electrodes") extending in the x-direction at equal intervals and a plurality of linear electrodes (referred to as "Y-electrodes") extending in the y-direction at equal intervals are arranged on top of each other, and a configuration in which a plurality of island-like electrodes are arranged in a matrix. The following description is based on the assumption that the former configuration is adopted.

As illustrated in FIGS. 2A and 2B, the touch screen 3 and each of the force sensors 10 are arranged inside of a recess portion 7a provided in the housing 7. The upper surface of the touch screen 3 is exposed to the surface of the housing 7 and provides a touch detection surface 3s for receiving an input of the user using an object, such as a finger F and a stylus S, illustrated in FIG. 1. The touch detection surface 3s serves as a click button and as a position detection region for detecting the position of the object. Therefore, the touch pad 2 is a "non-discrete type." The touch screen 3 in the illustrated example is not displaced by a press force applied to the touch detection surface 3s, and therefore, the touch pad 2 is a "pressure pad."

Each of the force sensors 10 is fixed between the touch screen 3 and a bottom portion (base) of the recess portion 7a and plays a role of detecting the press force applied to the touch detection surface 3s. The type of force sensor 10 is not particularly limited. For example, a piezoelectric element, a strain gauge, a capacitive element, an electromagnetic sensor, an optical sensor, a resistance sensor, or the like can be suitably used as the force sensor 10.

As illustrated in FIG. 2C, the four force sensors 10 are arranged at positions corresponding to four corners of the touch screen 3 on a plane. The integrated circuit 11 divides the touch detection surface 3s into one or more regions (=buttons) and stores the regions. The integrated circuit 11 acquires the pressed position based on the output of each of the force sensors 10 to determine the press state of each region. The details will be described later. This realizes what is called a right click and a left click.

The integrated circuit 11 is a dedicated integrated circuit provided for executing various processes described later related to the touch pad 2. The integrated circuit 11 is connected to the touch screen 3, each of the force sensors 10, and the CPU 6. It is possible to have the driver software of the touch pad 2 operating on the CPU 6 execute part or all of the processes executed by the integrated circuit 11. In this case, the driver software is also part of the touch pad 2 according to the present disclosure.

The integrated circuit 11 executes a process of detecting positions of various objects including the finger F and the stylus S illustrated in FIG. 1 on the touch detection surface 3s through the touch screen 3. The specific method of position detection is not particularly limited. For example, it may be preferable to adopt a detection method in which the detection of the finger F based on a capacitance system and the detection of the stylus S based on an active capacitive system are performed in a time division manner. The following description is based on the assumption that this detection method is adopted.

FIG. 3 is a schematic block diagram illustrating functional blocks of the integrated circuit 11. As illustrated in FIG. 3, the integrated circuit 11 has functions including an object detection unit 30, a button unit 31, an output unit 32, and a button function stop unit 33. A stylus detection unit 35 and a contact state detection unit 36 are provided in the object detection unit 30.

The object detection unit 30 is a functional unit that realizes a function of detecting the positions of the objects on the touch detection surface 3s (object detection function). Specifically, the object detection unit 30 is configured to perform the detection of the finger F based on the capacitance system and the detection of the stylus S based on the active capacitive system in a time division manner. The detections will be described in detail.

In the detection of the finger F, the object detection unit 30 supplies finger detection signals including pulses corresponding to the number of X-electrodes to the plurality of X-electrodes in the touch screen 3, and the plurality of Y-electrodes in the touch screen 3 receive the finger detection signals, respectively. The object detection unit 30 is configured to calculate the correlation between the signal received by each Y-electrode and the finger detection signal supplied to each X-electrode and derive the position of the finger F on the basis of the results. The capacitance at the intersection of a Y-electrode and each X-electrode is reflected in the amplitude of the finger detection signal received by that Y-electrode, and the capacitance at each intersection decreases when the finger F approaches. Therefore, the object detection unit 30 can execute the process to derive the position of the finger F.

The object detection unit 30 is configured to operate, for the detection of the stylus S, in either one of a discovery mode and a communication mode. The discovery mode is a mode entered when the stylus S is not detected yet. The object detection unit 30 in the discovery mode periodically transmits uplink signals from the plurality of X-electrodes or Y-electrodes, and sequentially scans the X-electrodes and the Y-electrodes in the touch screen 3 to wait for reception of a downlink signal transmitted by the stylus S that has received the uplink signals. When the downlink signal is received, the object detection unit 30 derives the position of the stylus S on the basis of the reception strength in the X-electrodes and the Y-electrodes (global scan). The object detection unit 30 derives the position in this way to detect the stylus S and enters into the mode of communication with the stylus S. After entering into the communication mode, the object detection unit 30 scans only the linear electrodes positioned near the most recently derived position of the stylus S to update the position of the stylus S (local scan).

The downlink signal transmitted from the stylus S includes a burst signal (for example, an unmodulated signal with a single frequency) used by the object detection unit 30 to detect the position of the stylus S as described above, and a data signal modulated by various types of data held in the stylus S. The transmission of the data signal including the data is instructed by the object detection unit 30 through the transmission of the uplink signal including a command. The data includes, for example, a pen pressure value indicating the pen pressure including the pressure applied to the pen tip of the stylus S, information indicating the on/off state of a switch arranged on the surface of the stylus S, and a pen identification (ID) for identifying the stylus S. The object detection unit 30 that has received the data signal decodes the received data signal to acquire the data transmitted from the stylus S.

In the communication mode, the object detection unit 30 intermittently executes transmission of the uplink signal for instructing the stylus S and reception of the downlink signal for detecting the position of the stylus S and receiving the data transmitted from the stylus S. When the downlink signal is not received for a predetermined time for a reason such as that the stylus S is away from the touch screen 3, the object detection unit 30 cancels the communication mode and returns to the discovery mode.

The stylus detection unit 35 is a functional unit that determines that the user is using the stylus S to perform the input operation. The stylus detection unit 35 according to the present embodiment is configured to determine that the user is using the stylus S to perform the input operation on the basis of the detection result of the downlink signal. More specifically, the stylus detection unit 35 determines that the user is using the stylus S to perform the input operation when the object detection unit 30 is in the communication mode of communicating with the stylus S and determines that the user is not using the stylus S to perform the input operation when the object detection unit 30 is in the discovery mode. The stylus detection unit 35 may use other methods to determine whether or not the user is using the stylus S to perform the input operation. Specific examples of the determination will be described later.

The contact state detection unit 36 is a functional unit that determines whether or not the stylus S is in contact with (in touch with) the touch detection surface 3s. Specifically, the contact state detection unit 36 refers to the pen pressure value included in the data signal received from the stylus S to determine that the stylus S is not in contact with the touch detection surface 3s when the pen pressure value is equal to or smaller than a predetermined threshold (for example, 0). The contact state detection unit 36 determines that the stylus S is in contact with the touch detection surface 3s when the pen pressure value is larger than the predetermined threshold.

In the present specification, the state indicating that the finger F or the stylus S is either in contact with or not in contact with the touch detection surface 3s will be referred to as a "contact state," and the state in which the finger F or the stylus S is in contact with the touch detection surface 3s will be referred to as a "making contact" state. When the finger F is "making contact," the object detection unit 30 supplies the coordinates indicating the position of the finger F to the output unit 32. On the other hand, when the stylus S is "making contact," the object detection unit 30 supplies the coordinates indicating the position of the stylus S and the received data from the stylus S to the output unit 32. The determination result of the stylus detection unit 35 in this case is that "the user is using the stylus S to perform the input operation," and the determination result of the contact state detection unit 36 is that "the stylus S is making contact."

In the present specification, the state in which the stylus S is in the area of communication with the object detection unit 30, but not in contact with the touch detection surface 3s, will be referred to as a "hovering" state. When the stylus S is "hovering," the object detection unit 30 supplies the coordinates indicating the position of the stylus S and the data received from the stylus S to the output unit 32. The determination result of the stylus detection unit 35 is that "the user is using the stylus S to perform the input operation," and the determination result of the contact state detection unit 36 is that "the stylus S is not making contact."

The button unit 31 is a functional unit that realizes a function of detecting the press state of buttons based on the force applied to the touch detection surface 3s (button function). Specifically, the button unit 31 virtually divides the touch detection surface 3s into one or more regions (=buttons) and stores the regions. The button unit 31 acquires the press force of each region on the basis of the output of each of the force sensors 10. The button unit 31 determines that the user has pressed the button of the region in which the press force exceeds a predetermined threshold.

The button unit 31 periodically executes the determination, and in every determination, the button unit 31 generates a button press state value of each region indicating the press state of the region. For example, the button unit 31 sets the button press state value of a button to "1" when the button unit 31 determines that the button is pressed, and the button unit 31 sets the button press state value of a button to "0" when the button unit 31 determines that the button is not pressed. The button press state value generated by the button unit 31 is supplied to the output unit 32.

The output unit 32 is a functional unit that functions as an interface between the object detection unit 30 and the CPU 6 and between the button unit 31 and the CPU 6. The data supplied from the output unit 32 to the CPU 6 will be specifically described with reference to FIG. 4.

FIG. 4 depicts a configuration of data supplied from the output unit 32 to the CPU 6. FIG. 4 illustrates an example of a case in which the touch detection surface 3s is divided into two regions (=button 1 and button 2). As illustrated in FIG. 4, the data supplied from the output unit 32 to the CPU 6 in this case includes the number of contacts, a button press state value of the button 1, a button press state value of the button 2, a contact state of the finger F, coordinates of the finger F, a contact state of the stylus S, coordinates of the stylus S, and reception data received from the stylus S. The output unit 32 acquires these data based on various types of data acquired by the object detection unit 30, and supplies the data to the CPU 6.

The data illustrated in FIG. 4 will be specifically described. The output unit 32 sets the "contact state of finger F" to "1" when the finger F is making contact (time $t_1$ to $t_4$) and sets the "contact state of finger F" to "0" when the finger F is not making contact (time $t_5$ to $t_{14}$). The output unit 32 sets the "contact state of stylus S" to "1" when the stylus S is making contact (time $t_2$ to $t_8$) and sets the "contact state of stylus S" to "0" when the stylus S is not making contact (time $t_1$ and $t_9$ to $t_{14}$). "The number of contacts" is a sum value of the "contact state of finger F" and the "contact state of stylus S," and "the number of contacts" plays a role of notifying the CPU 6 of the number of objects touching the touch detection surface 3s.

When the coordinates indicating the position of the finger F are supplied from the object detection unit 30, the output unit 32 transfers the coordinates as the "coordinates of finger F" to the CPU 6 (time $t_1$ to $t_4$). On the other hand, when the coordinates indicating the position of the finger F are not supplied from the object detection unit 30, the output unit 32 stops outputting the "coordinates of finger F" (time $t_5$ to $t_{14}$). This is similarly applied to the "coordinates of stylus S" and the "received data from stylus S." Note that $P_n$ illustrated in FIG. 4 represents coordinates (x, y), and $D_n$ represents reception data received from the stylus S. In addition, "NR" is an abbreviation of "Not Reported," and this represents that the output is stopped.

When the button press state value of the button 1 or the button 2 is supplied from the button unit 31, the output unit 32 further transfers the button press state value as a "button press state value" to the CPU 6. On the other hand, when the button press state value is not supplied from the button unit 31, the output unit 32 stops outputting the "button press state value." Even when the button press state value is supplied from the button unit 31, when the button press state value supplied from the button unit 31 indicates that the button is not pressed (that is, when the button press state value is "0"), the output unit 32 stops outputting the "button press state value" after transferring only the first button press state value to the CPU 6 (time $t_5$ for button 1, time $t_{13}$ for button 2). This is because there is no need to continuously notify the CPU 6 of the fact that the buttons are not pressed.

FIG. 3 will be further described. The CPU 6 that has received the data from the output unit 32 first refers to "the number of contacts" to acquire the number of position indicators (fingers F or styluses S) making contacts. The CPU 6 also refers to the "contact state of finger F" and the "contact state of stylus S" to acquire the contact state of the finger F and the stylus S, respectively.

The CPU 6 further executes a movement process of cursor, a generation process of digital ink, and the like, on the basis of the supplied coordinates when the "coordinates of finger F" or the "coordinates of stylus S" are supplied. The CPU 6 also executes a process responsive to the content of the reception data when the "reception data from stylus S" is supplied. For example, the CPU 6 executes a process of controlling the line width or the transparency of the digital ink according to the pen pressure value when the reception data received from the stylus S is a pen pressure value.

When the button press state value supplied from the output unit 32 is "1," the CPU 6 executes a predetermined process (such as a process of selecting a character) as a process triggered by pressing of the corresponding button. When the button press state value becomes "0" or is stopped, the CPU 6 executes a predetermined process (such as cancelling the selection of the character) as a process triggered by release of the pressing of the corresponding button.

The configuration in the integrated circuit 11 will be further described. The button function stop unit 33 is a functional unit that causes the integrated circuit 11 to stop outputting the button press state value (output from the output unit 32 to the CPU 6) according to the input operation state of the stylus S. Specifically, the button function stop unit 33 controls the output unit 32 to stop outputting the button press state value when the stylus detection unit 35 determines that the user is using the stylus S to perform the input operation. This causes the integrated circuit 11 to stop outputting the button press state value when the user is using the stylus S to perform the input operation.

According to the touch pad 2 of the present embodiment, the integrated circuit 11 stops outputting the button press state value when the user uses the stylus S to perform the input operation as described above. Therefore, the CPU does not execute the process corresponding to the button being pressed, and this can prevent generation of a click operation not intended by the user when the user uses the stylus S to perform an input operation on the non-discrete type touch pad 2.

Although the button function stop unit 33 controls the output unit 32 to stop outputting the button press state value to cause the integrated circuit 11 to stop outputting the button press state value in the embodiment described above, the button function stop unit 33 may use other methods to cause the integrated circuit 11 to stop outputting the button press state value. For example, the button function stop unit 33 may stop the output of each of the force sensors 10 to cause the integrated circuit 11 to stop outputting the button press state value or may control another part in the integrated circuit 11 (for example, stopping the function of the button unit 31 to prevent the button press state value from being supplied to the output unit 32) to cause the integrated circuit 11 to stop outputting the button press state value.

Although the button function stop unit 33 causes the integrated circuit 11 to stop outputting the button press state value when the stylus detection unit 35 determines that the user is using the stylus S to perform the input operation in the embodiment, the button function stop unit 33 may cause the integrated circuit 11 to stop outputting the button press state value in other cases. For example, the button function stop unit 33 may cause the integrated circuit 11 to stop outputting the button press state value when the contact state detection unit 36 determines that the stylus S is in contact with the touch detection surface 3s. In this way, the output of the button press state value is not stopped when the stylus S is hovering, and, for example, the user can use the finger F to perform a click operation on the touch pad 2 while the stylus S is hovering.

The button function stop unit 33 may cause the integrated circuit 11 to stop outputting the button press state value according to a setting related to the input operation of the stylus S instead of the input operation state of the stylus S. Specific examples of the setting include a process of causing the integrated circuit 11 to stop outputting the button press state value when the user turns off a hardware switch (a user-operable unit), which is not illustrated, and a process of causing the integrated circuit 11 to stop outputting the button press state value when the user explicitly creates a setting in the driver software of the touch pad 2 to indicate that the user is using the stylus to perform an input operation.

Although the stylus detection unit 35 determines that the user is using the stylus S to perform the input operation on the basis of the detection result of the downlink signal in the embodiment described above, the stylus detection unit 35 may determine that the user is using the stylus S to perform the input operation on the basis of other types of information. For example, in a case where both the notebook computer 1 and the stylus S are compatible with Bluetooth (registered trademark), the stylus detection unit 35 may determine that the user is using the stylus S to perform the input operation when the notebook computer 1 is paired with the stylus S through Bluetooth (registered trademark). The stylus detection unit 35 may also determine that the user is using the stylus S to perform the input operation when the user extracts the stylus S from a "garage" 7c (see FIG. 11) to be described later (that is, when the output of a garage switch described later indicates that the stylus S is not housed in the notebook computer 1).

Although the active capacitive system is used to detect the stylus S in the embodiment described above, the same capacitance system as for the finger F may be used to detect the stylus S. In this case, it is preferable that the stylus detection unit 35 determine that the user is using the stylus S to perform the input operation on the basis of the area of a region in which the object is detected by the object detection unit 30 (that is, the region in which the amount of change in capacitance is equal to or greater than a predetermined value). More specifically, the area of the above-described region in the stylus S is smaller than that of the finger F, and therefore, it is preferable that the stylus detection unit 35 determines that the user is using the stylus S to perform the input operation when the area of the above-described region is equal to or smaller than a predetermined value.

Next, the touch pad 2 according to a second embodiment of the present disclosure will be described. The touch pad 2 according to the present embodiment is different from the touch pad 2 of the first embodiment in that haptics is used to produce the sense of clicking on the touch pad 2, and the touch pad 2 according to the present embodiment is similar to the touch pad 2 of the first embodiment in other respects. Therefore, the same reference signs are provided to refer to the same components as in the first embodiment, and the differences from the first embodiment will be mainly described.

Figure 5A:
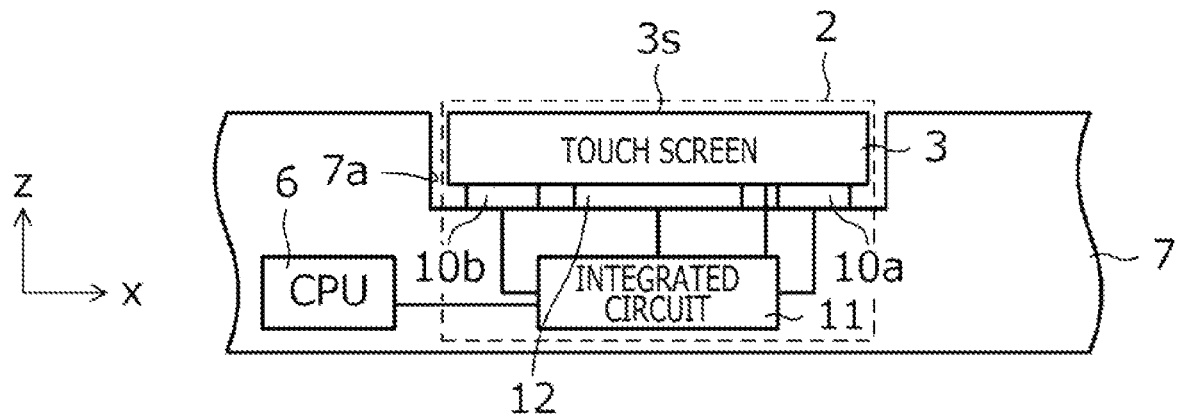
FIG. 5A depicts a y-direction cross section of the notebook computer near the touch pad according to a second embodiment of the present disclosure.
Figure 5B:
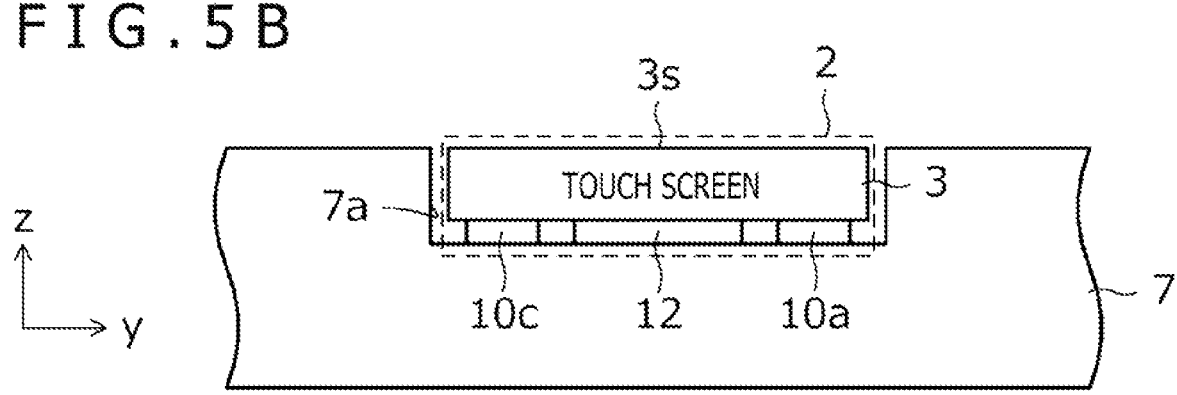
FIG. 5B depicts an x-direction cross section of the notebook computer near the touch pad according to the second embodiment of the present disclosure.

FIG. 5A depicts a y-direction cross section of the notebook computer 1 (see FIG. 1) near the touch pad 2 according to the present embodiment, and FIG. 5B depicts an x-direction cross section of the notebook computer 1 near the touch pad 2 according to the present embodiment. As can be understood by comparing FIGS. 5A and 5B with FIGS. 2A and 2B, the touch pad 2 according to the present embodiment is different from the touch pad 2 according to the first embodiment in that the touch pad 2 according to the present embodiment includes a haptic apparatus 12 between the touch screen 3 and the bottom portion (base) of the recess portion 7a.

The haptic apparatus 12 is an apparatus that provides sensory feedback to the user. The type of haptic apparatus 12 does not particularly matter as long as the sensory feedback can be provided to the user, and the haptic apparatus 12 can include, for example, a vibrating body, a magnetic fluid, an artificial muscle, and an actuator.

Figure 5C:
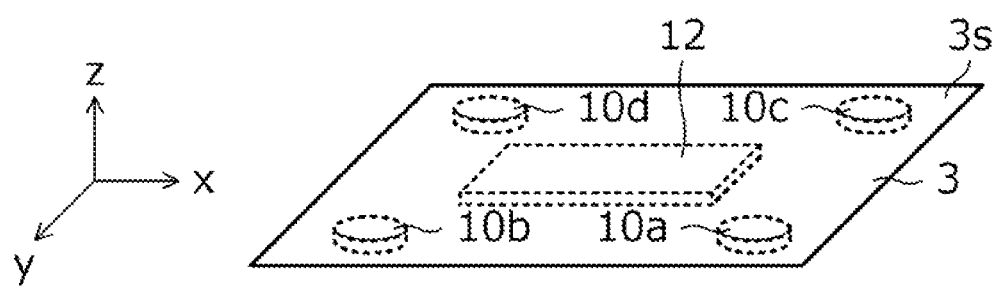
FIG. 5C depicts a positional relation, on a plane, among the touch screen, the four force sensors, and a haptic apparatus included in the touch pad according to the second embodiment of the present disclosure.

FIG. 5C depicts a positional relation, on a plane, among the touch screen 3, the four force sensors 10a to 10d, and the haptic apparatus 12 included in the touch pad 2 according to the present embodiment. As illustrated in FIG. 5C, the haptic apparatus 12 is arranged in a region surrounded by the force sensors 10a to 10d, near the center of the touch detection surface 3s.

The button unit 31 according to the present embodiment uses the touch detection surface 3s without dividing the touch detection surface 3s. Therefore, the entire touch detection surface 3s provides one button. The arrangement of the haptic apparatus 12 illustrated in FIG. 5C corresponds to the configuration of a button. The touch detection surface 3s may obviously be divided, and, in that case, it is preferable to individually arrange the haptic apparatus 12 for each of the divided regions.

Figure 6:
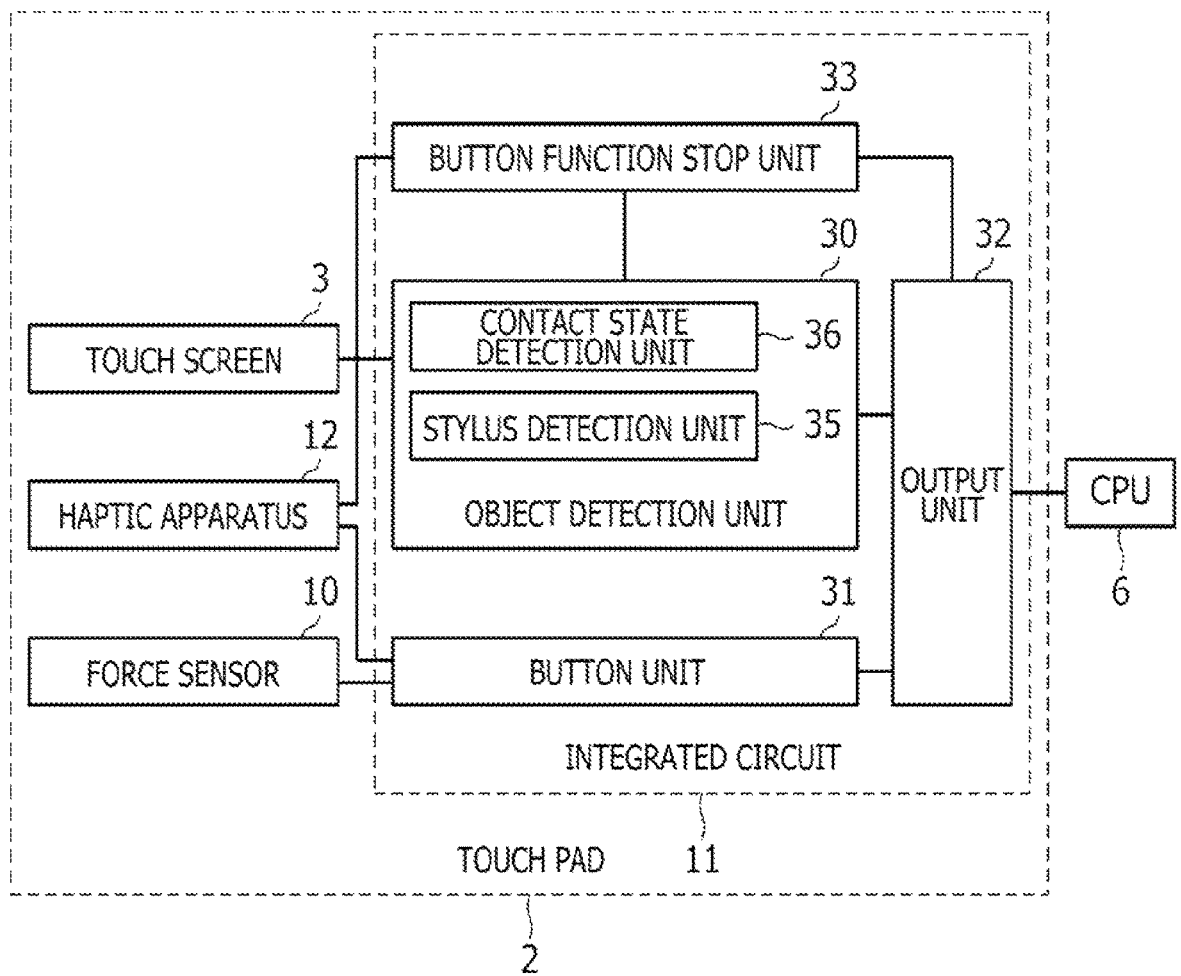
FIG. 6 is a schematic block diagram illustrating functional blocks of the integrated circuit according to the second embodiment of the present disclosure.

FIG. 6 is a schematic block diagram illustrating functional blocks of the integrated circuit 11 according to the present embodiment. The button unit 31 according to the present embodiment controls the haptic apparatus 12 to output sensory feedback, according to the force applied to the touch detection surface 3s. More specifically, the button unit 31 causes the haptic apparatus 12 to output sensory feedback when the button unit 31 determines that the press force exceeds a predetermined threshold. As a result, the sense of clicking can be provided to the user pressing the touch detection surface 3s, although the touch screen 3 is not displaced unlike in the click pad type touch pad, to be described later.

The button function stop unit 33 according to the present embodiment causes the integrated circuit 11 to stop outputting the button press state value as in the first embodiment and further causes the haptic apparatus 12 to stop outputting the sensory feedback, according to the input operation state of the stylus S or a setting related to the input operation of the stylus S. The stopping may be realized by directly controlling the haptic apparatus 12 or may be realized by controlling the button unit 31 so as not to control the haptic apparatus 12. This can prevent providing only the sensory feedback to the user when generation of a click operation is suppressed by causing the integrated circuit 11 to stop outputting the button press state value.

As described above, the touch pad 2 according to the present embodiment not only causes the integrated circuit 11 to stop outputting the button press state value, but also causes the haptic apparatus 12 to stop outputting the sensory feedback when the user uses the stylus S to perform the input operation. This can prevent confusion on the part of the user receiving only the sensory feedback (of a click operation) when generation of a click operation is suppressed.

Next, the touch pad 2 according to a third embodiment of the present disclosure will be described. The touch pad 2 according to the present embodiment is different from the touch pad 2 of the first embodiment in that the touch pad 2 according to the present embodiment is a click pad instead of the pressure pad, and the touch pad 2 according to the present embodiment is similar to the touch pad 2 of the first embodiment in other respects. Therefore, the same reference signs are provided to refer to the same components as in the first embodiment, and the differences from the first embodiment will be mainly described.

Figure 7A:
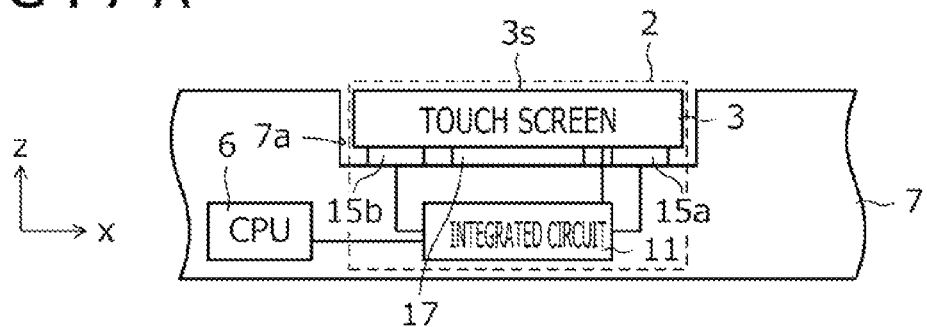
FIG. 7A depicts a y-direction cross section of the notebook computer near the touch pad according to a third embodiment of the present disclosure.
Figure 7B:
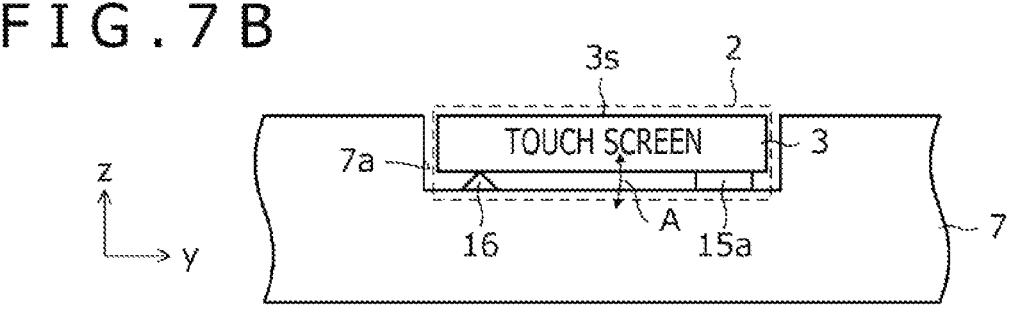
FIG. 7B depicts an x-direction cross section of the notebook computer near the touch pad according to the third embodiment of the present disclosure.
Figure 7C:
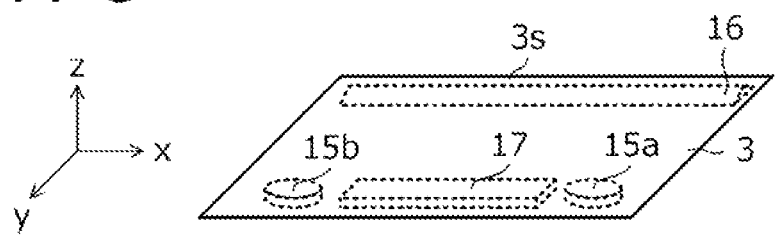
FIGS. 7C and 7D depict positional relations, on a plane, among the touch screen, push button switches, an indication member, and a spacer according to the third embodiment of the present disclosure.
Figure 7D:
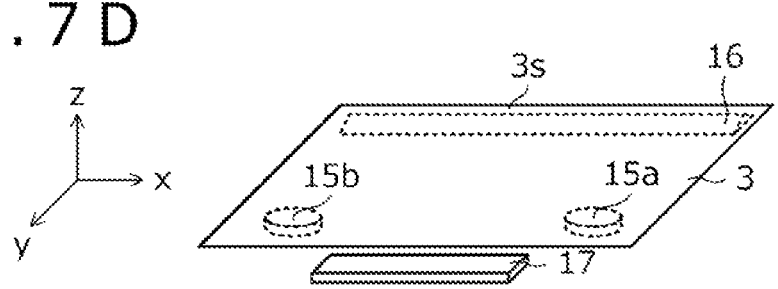

FIG. 7A depicts a y-direction cross section of the notebook computer 1 (see FIG. 1) near the touch pad 2 according to the present embodiment, and FIG. 7B depicts an x-direction cross section of the notebook computer 1 near the touch pad 2 according to the present embodiment. FIGS. 7C and 7D depict positional relations, on a plane, among the touch screen 3, push button switches 15a and 15b, an indication member 16, and a spacer 17 included in the touch pad 2 according to the present embodiment. As can be understood by comparing FIGS. 7A to 7D with FIGS. 2A to 2C, the touch pad 2 according to the present embodiment is different from the touch pad 2 according to the first embodiment in that the touch pad 2 according to the present embodiment includes the push button switches 15a and 15b in place of the force sensors 10a and 10b, does not include the force sensors 10c and 10d, and includes the indication member 16 and the spacer 17.

The push button switches 15a and 15b are switches that are turned on when a force greater than a certain level is applied from the upper side and that are turned off when the force is removed. The height (length in z-direction) of the push button switches 15a and 15b change within a certain range according to the force from the upper side. When a force is not applied from the upper side, the push button switches 15a and 15b play a role of supporting the touch screen 3. On the other hand, when a force greater than the certain level is applied from the upper side, the push button switches 15a and 15b function as stoppers of the touch screen 3. Further, the push button switches 15a and 15b can include, for example, rubber contacts to provide the sense of clicking to the user when the push button switches 15a and 15b are turned on.

As can be understood from FIGS. 7B to 7D, the indication member 16 is a member in a triangular prism shape laid down and arranged in a space between the touch screen 3 and the bottom surface of the recess portion 7a, at a position along one side positioned on the deep side in the y-direction as viewed from the user of the rectangular touch detection surface 3s. One of the three side surfaces of the indication member 16 is entirely fixed to the bottom surface of the recess portion 7a. An edge of the indication member 16 opposite from the side surface attached to the bottom surface of the recess portion 7a is entirely in contact with the lower surface of the touch screen 3. Due to such structure of the indication member 16, the touch screen 3 can be displaced along an arrow A illustrated in FIG. 7B when the user applies a press force to the touch detection surface 3s. As a result of the displacement, the touch screen 3 presses the push button switches 15a and 15b, and, when the push button switches 15a and 15b are turned on, the CPU 6 executes a corresponding process of a click operation (details will be described later).

The touch screen 3 according to the present embodiment is designed to be slightly bent when a press force is applied from the upper side. Only the push button switch 15a is turned on when the user pushes the right side of the touch detection surface 3s, and only the push button switch 15b is turned on when the user pushes the left side of the touch detection surface 3s. This realizes what is called a right click and a left click.

The spacer 17 is, for example, a plate-shaped member, and the spacer 17 can be attached to and removed from between the touch screen 3 and the housing 7 through an opening (not illustrated) provided in the housing 7. Because the user can manually attach and remove the spacer 17, the spacer 17 forms part of a user-operable unit of the notebook computer 1.

The spacer 17 functions as a displacement suppression unit configured to suppress displacement of the touch screen 3 when the spacer 17 is installed between the touch screen 3 and the housing 7. More specifically, the spacer 17 prevents displacement of the touch screen 3 even if a press force is applied from the upper side of the touch screen 3, and therefore, the touch screen 3 cannot be displaced. As a result, the push button switches 15a and 15b are not turned on. On the other hand, nothing prevents displacement when the spacer 17 is not installed between the touch screen 3 and the housing 7, and therefore, the touch screen 3 can be displaced according to the press force applied to the touch detection surface 3s. Thus, the push button switch 15a and 15b can be turned on.

Although the spacer 17 is installed between the push button switches 15a and 15b in the example illustrated in FIG. 7C, the spacer 17 may be installed in other positions as long as the spacer 17 functions as a displacement suppression unit configured to suppress displacement of the touch screen 3.

Figure 8:
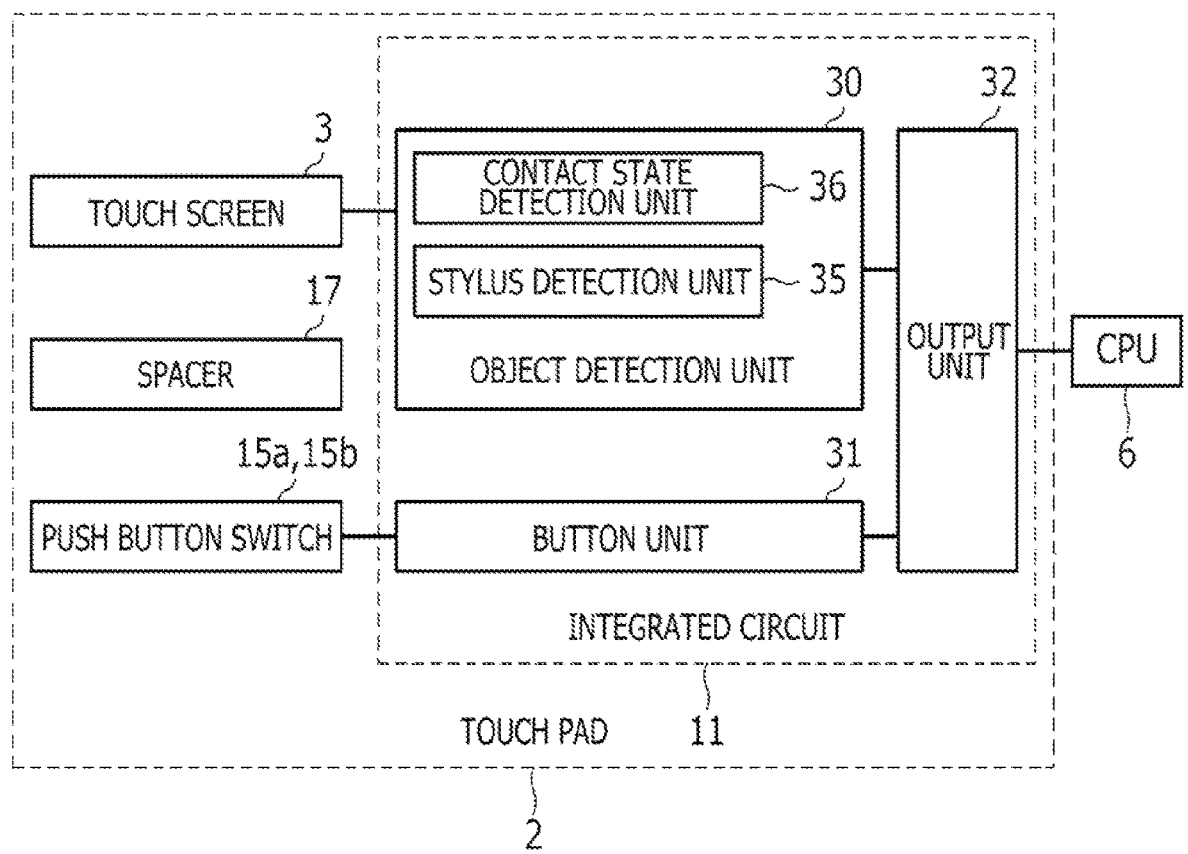
FIG. 8 is a schematic block diagram illustrating functional blocks of the integrated circuit according to the third embodiment of the present disclosure.

FIG. 8 is a schematic block diagram illustrating functional blocks of the integrated circuit 11 according to the present embodiment. FIG. 8 is different from FIG. 3 in that the button function stop unit 33 is not provided in the integrated circuit 11, and the spacer 17 is provided instead.

The button unit 31 according to the present embodiment is configured to generate a button press state value of the button 1 on the basis of the on/off state of the push button switch 15a, and to generate a button press state value of the button 2 on the basis of the on/off state of the push button switch 15b. Specifically, the button unit 31 sets the button press state value of the button 1 to "1 (value indicating that the button is pressed)" when the push button switch 15a is on, and sets the button press state value of the button 1 to "0 (value indicating that the button is not pressed)" when the push button switch 15a is off. The button unit 31 sets the button press state value of the button 2 to "1" when the push button switch 15b is on and sets the button press state value of the button 2 to "0" when the push button switch 15b is off.

When the user installs the spacer 17 between the touch screen 3 and the housing 7, the push button switches 15a and 15b are not turned on even if the user presses the touch detection surface 3s as described above. As a result, the button press state values generated by the button unit 31 are always "0," and the output of the output unit 32 is stopped ("NR" illustrated in FIG. 4). Therefore, in the present embodiment, the spacer 17 functions as a button function stop unit configured to cause the integrated circuit 11 to stop outputting the button press state value according to a setting related to the input operation of the stylus S (that is, the setting is insertion of the spacer 17 by the user). This can cause the integrated circuit 11 to stop outputting the button press state value when the user uses the stylus S to perform the input operation as in the first embodiment.

According to the touch pad 2 of the present embodiment, the spacer 17 functions as a button function stop unit as described above. This can prevent generation of a click operation not intended by the user when the user uses the stylus S to perform the input operation as in the first embodiment.

According to the touch pad 2 of the present embodiment, the touch screen 3 is not displaced when the spacer 17 is inserted. This can prevent an abrupt change in the pressure applied to the pen tip of the stylus S caused by sudden displacement of the touch screen 3 when the user uses the stylus S to perform an input operation. This prevents disturbance to the user's handwriting operation and generation of discontinuous pen pressure values.

Next, the touch pad 2 according to a fourth embodiment of the present disclosure will be described. The touch pad 2 according to the present embodiment is different from the touch pad 2 of the third embodiment in that the touch pad 2 according to the present embodiment includes an actuator 18 in place of the spacer 17 and includes the button function stop unit 33 in the integrated circuit 11 as in the first embodiment. The touch pad 2 according to the present embodiment is similar to the touch pad 2 of the third embodiment in other respects. Therefore, the same reference signs are provided to refer to the same components as in the third embodiment, and the differences from the third embodiment will be mainly described.

Figure 9A:
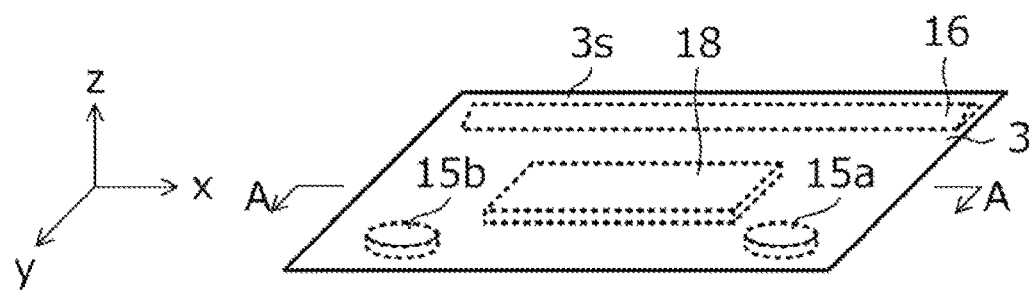
FIG. 9A depicts a positional relation, on a plane, among the touch screen, the push button switches, the indication member, and an actuator included in the touch pad according to a fourth embodiment of the present disclosure.

FIG. 9A depicts a positional relation, on a plane, among the touch screen 3, the push button switches 15a and 15b, the indication member 16, and the actuator 18 included in the touch pad 2 according to the present embodiment. As illustrated in FIG. 9A, the touch pad 2 according to the present embodiment includes the actuator 18 at a position corresponding to the center of the touch screen 3 in a plan view. The position of the installation of the actuator 18 may be between the push button switches 15a and 15b similarly to the spacer 17 of the third embodiment.

Figure 9B:
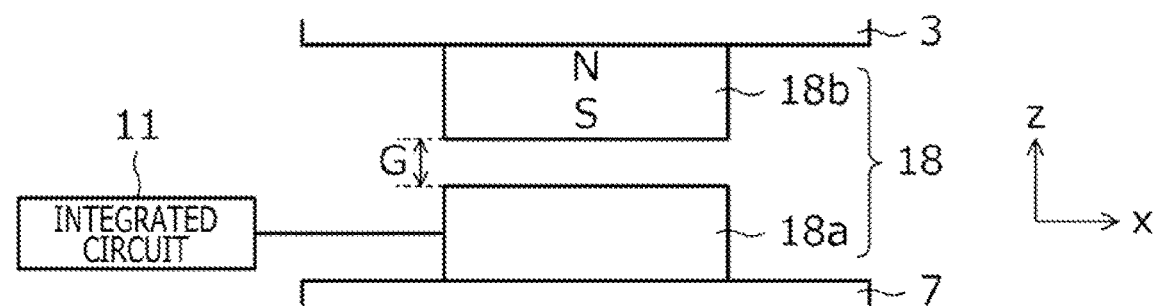
FIGS. 9B and 9C depict y-direction cross sections of the notebook computer near the actuator.
Figure 9C:
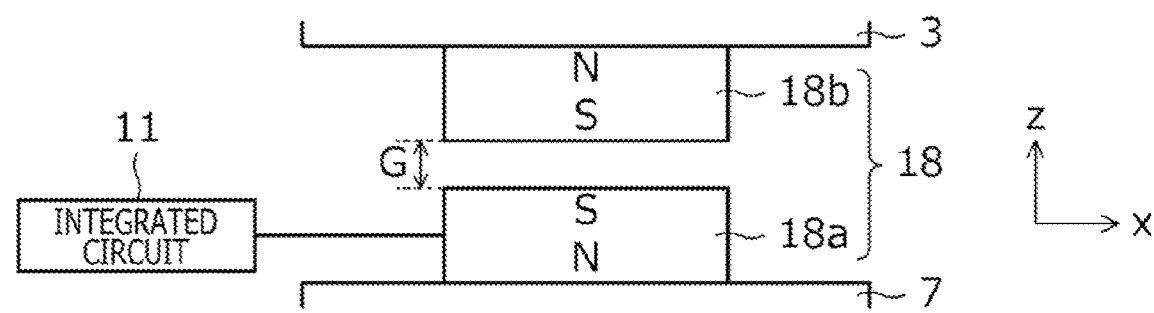

FIGS. 9B and 9C depict a y-direction cross section of the notebook computer 1 (see FIG. 1) near the actuator 18. As illustrated in FIGS. 9B and 9C, the actuator 18 includes an electromagnet 18a fixed to the housing 7 (more specifically, to the bottom surface of the recess portion 7a illustrated in FIG. 7A and the like) and a permanent magnet 18b fixed to the bottom surface of the touch screen 3. A predetermined gap G is provided between the upper surface of the electromagnet 18*a* and the lower surface of the permanent magnet 18*b*. The gap G is set to a value larger than the amount of displacement of the push button switches 15*a* and 15*b* pressed by the touch screen 3. The electromagnet 18*a* is connected to the integrated circuit 11. Note that the electromagnet 18*a* may be fixed to the lower surface of the touch screen 3, and the permanent magnet 18*b* may be fixed to the bottom surface of the recess portion 7*a*.

The integrated circuit 11 can control the current applied to the electromagnet 18*a* to control whether or not to generate a magnetic force from the electromagnet 18*a*. Note that the direction of the current generated by the integrated circuit 11 to flow in the electromagnet 18*a* is the direction of repulsion of the electromagnet 18*a* and the permanent magnet 18*b*. For example, the lower surface of the permanent magnet 18*b* is the south pole in the example illustrated in FIG. 9C, and, in this case, the integrated circuit 11 controls the direction of the current generated to flow in the electromagnet 18*a* such that the upper surface of the electromagnet 18*a* becomes the south pole.

The actuator 18 functions as a displacement suppression unit configured to suppress displacement of the touch screen 3 when the current is supplied from the integrated circuit 11. More specifically, a repulsive force acts between the electromagnet 18*a* and the permanent magnet 18*b* when a magnetic force is generated by the electromagnet 18*a* as a result of the current supplied from the integrated circuit 11. Therefore, the touch screen 3 cannot be displaced even if a press force is applied to the touch detection surface 3*s*. As a result, the push button switches 15*a* and 15*b* are not turned on. On the other hand, a repulsive force is not generated between the electromagnet 18*a* and the permanent magnet 18*b* when the current is not supplied from the integrated circuit 11 to the actuator 18. Therefore, the touch screen 3 can be displaced according to the press force applied to the touch detection surface 3*s*, and the push button switches 15*a* and 15*b* can be turned on.

Figure 10:
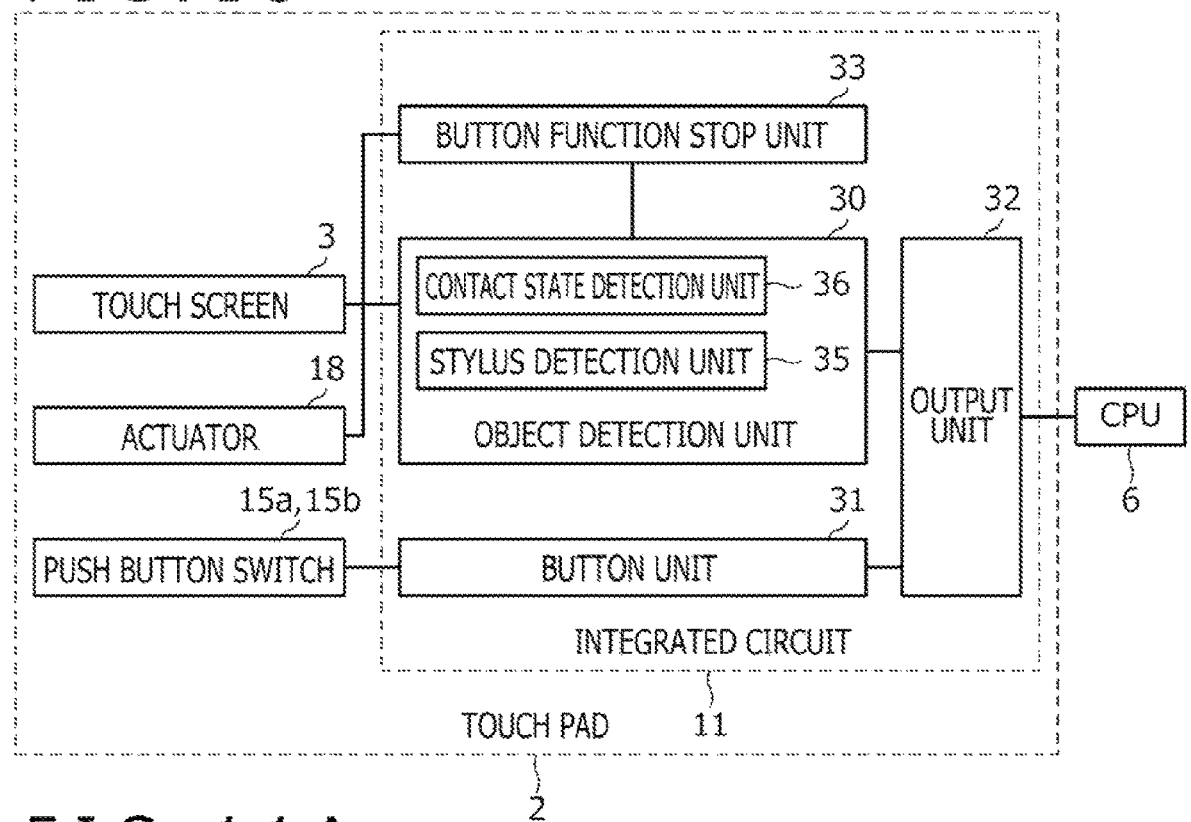
FIG. 10 is a schematic block diagram illustrating functional blocks of the integrated circuit according to the fourth embodiment of the present disclosure.

FIG. 10 is a schematic block diagram illustrating functional blocks of the integrated circuit 11 according to the present embodiment. As can be understood by comparing FIG. 10 with FIG. 8, the touch pad 2 according to the present embodiment is different from the touch pad 2 according to the third embodiment in that the touch pad 2 according to the present embodiment includes the actuator 18 in place of the spacer 17 and includes the button function stop unit 33 in the integrated circuit 11. The functions of the button function stop unit 33 are similar to the functions in the first embodiment except that the actuator 18 is controlled instead of the output unit 32. The functions of the button unit 31 according to the present embodiment are similar to the functions in the third embodiment.

The button function stop unit 33 according to the present embodiment is configured to control the current caused to flow in the electromagnet 18*a* in the actuator 18 according to the input operation state of the stylus S or a setting related to the input operation of the stylus S. Specifically, as described above, the button function stop unit 33 controls the current to be flow in the electromagnet 18*a* to prevent displacement of the touch screen 3 in cases such as when the stylus detection unit 35 determines that the user is using the stylus S to perform the input operation, or when the contact state detection unit 36 determines that the stylus S is in contact with the touch detection surface 3*s*, or when the user turns off a hardware switch (a user-operable unit), which is not illustrated, or when the user explicitly creates a setting in the driver software of the touch pad 2 to indicate that the user is using the stylus to perform an input operation, or the like. This causes the integrated circuit 11 to stop outputting the button press state value when the user uses the stylus S to perform the input operation. Although a plurality of conditions are illustrated here as conditions for the button function stop unit 33 to cause a current to flow in the electromagnet 18*a*, it is actually only necessary to adopt just one or more conditions.

As described above, the button function stop unit 33 can control the current caused to flow in the electromagnet 18*a* to suppress displacement of the touch screen 3 according to the touch pad 2 of the present embodiment. This can prevent generation of a click operation not intended by the user when the user uses the stylus S to perform an input operation as in the first and third embodiments.

In addition, according to the touch pad 2 of the present embodiment, the touch screen 3 is not displaced when the current flows in the electromagnet 18*a*. This can prevent an abrupt change in the pressure applied to the pen tip of the stylus S caused by sudden displacement of the touch screen 3 when the user uses the stylus S to perform an input operation. This prevents disturbance to the user's handwriting operation and generation of discontinuous pen pressure values as in the third embodiment.

Next, the touch pad 2 according to a fifth embodiment of the present disclosure will be described. The specific configuration of the displacement suppression unit in the touch pad 2 according to the present embodiment is different from that of the third embodiment, and the touch pad 2 according to the present embodiment is similar to the touch pad 2 of the third embodiment in other respects. Therefore, the same reference signs are provided to refer to the same components as in the third embodiment, and the differences from the third embodiment will be mainly described.

Figure 11A:
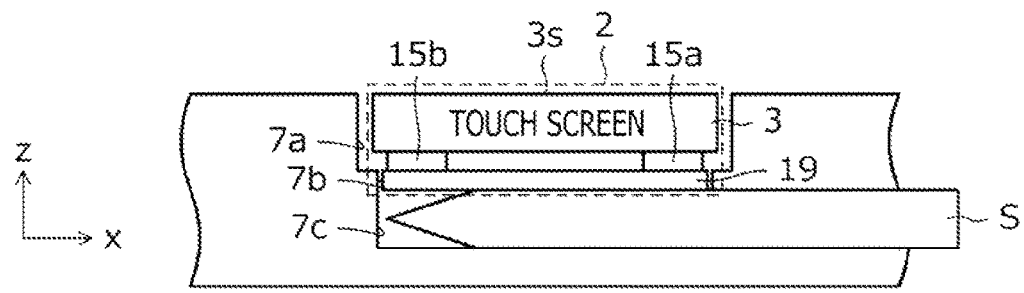
FIG. 11A depicts a y-direction cross section of the notebook computer near the touch pad according to a fifth embodiment of the present disclosure.
Figure 11B:
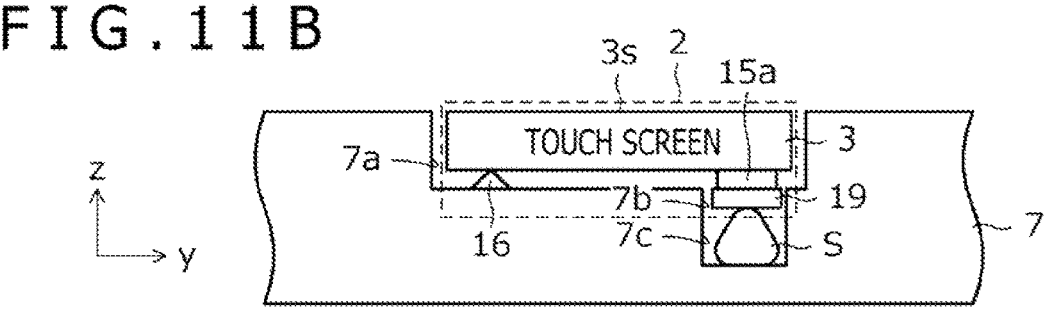
FIG. 11B depicts an x-direction cross section of the notebook computer near the touch pad according to the fifth embodiment of the present disclosure.

FIG. 11A depicts a y-direction cross section of the notebook computer 1 (see FIG. 1) near the touch pad 2 according to the present embodiment, and FIG. 11B depicts an x-direction cross section of the notebook computer 1 near the touch pad 2 according to the present embodiment. As illustrated in FIGS. 11A and 11B, the housing 7 according to the present embodiment includes a garage 7*c* below the push button switches 15*a* and 15*b*. The garage 7*c* is an elongated hole that can house the stylus S, and the garage 7*c* communicates with the recess portion 7*a* through an opening 7*b* provided on the bottom surface of the recess portion 7*a*.

The push button switches 15*a* and 15*b* according to the present embodiment are fixed to a cuboid base 19 arranged in the opening 7*b*, instead of the bottom surface of the recess portion 7*a*. The base 19 is placed over the stylus S when the stylus S is housed in the garage 7*c*, and the upper surface of the base 19 is flush with the bottom surface of the recess portion 7*a*. In this aspect the touch pad 2 functions as a conventional click pad.

The garage 7*c*, the opening 7*b*, the base 19, and the stylus S provide a garage switch for switching (controlling) between whether or not the touch screen 3 can be displaced, based on whether or not the stylus S is housed in the notebook computer 1. The user manually attaches and removes the stylus S to and from the garage 7*c*, and therefore, the garage switch forms part of a user-operable unit of the notebook computer 1.

Figure 12A:
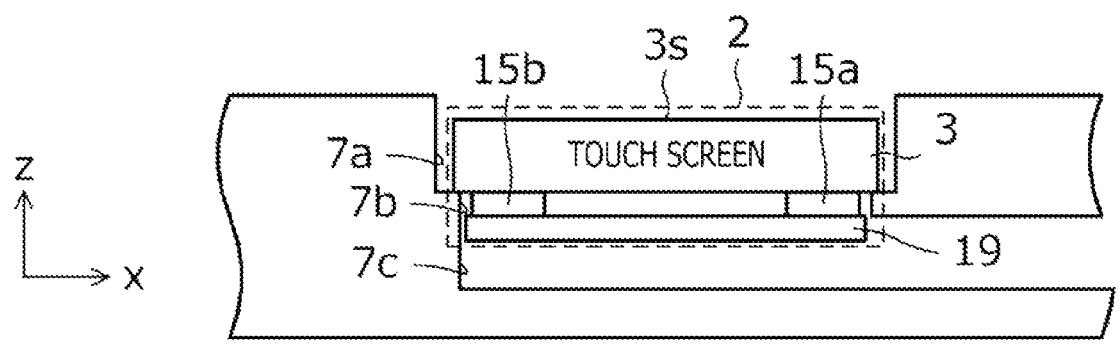
FIGS. 12A and 12B depict states in which a stylus in FIGS. 11A and 11B is removed, respectively.
Figure 12B:
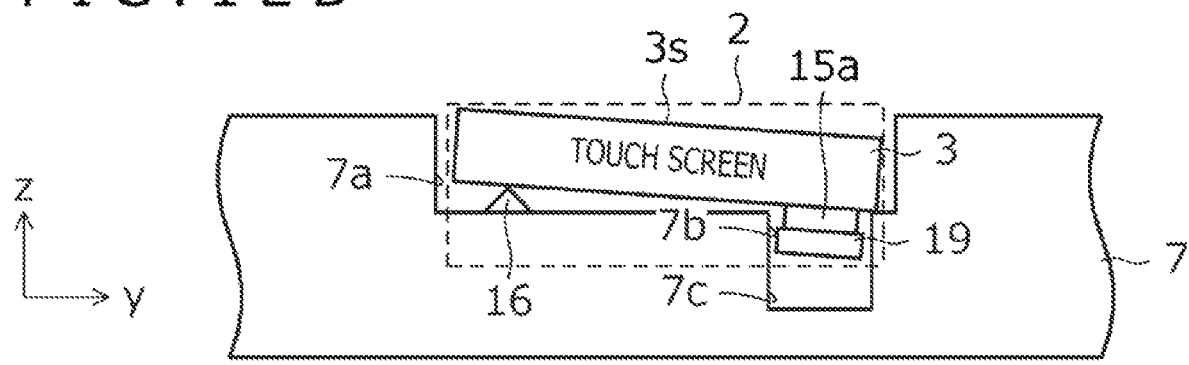
Figure 13A:
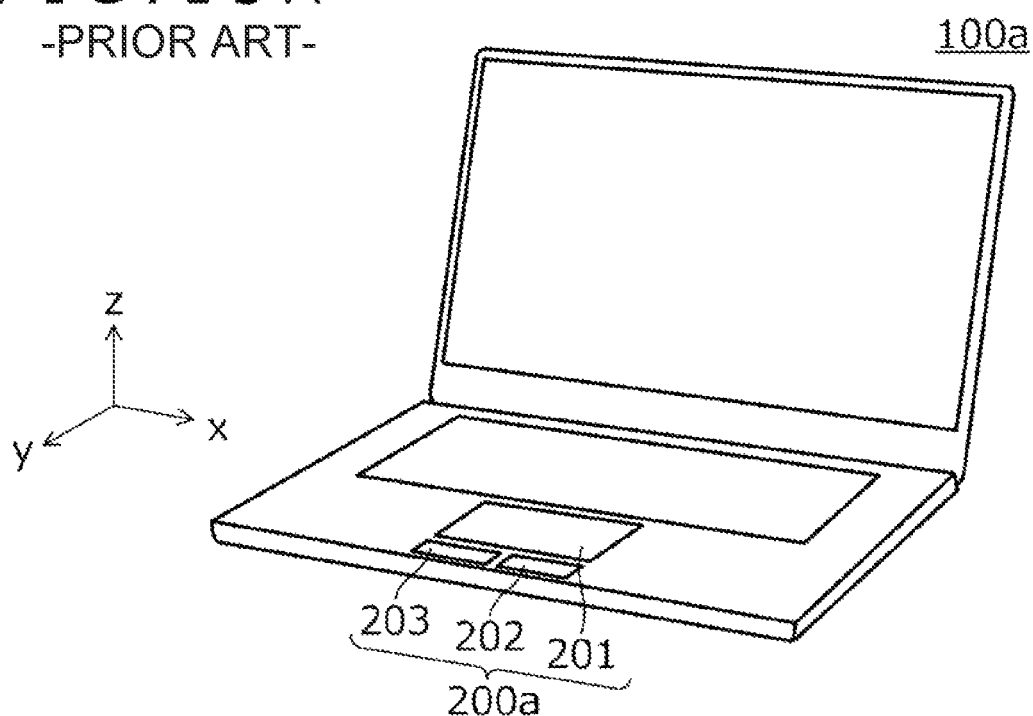
FIG. 13A depicts a notebook computer including a discrete type touch pad.
Figure 13B:
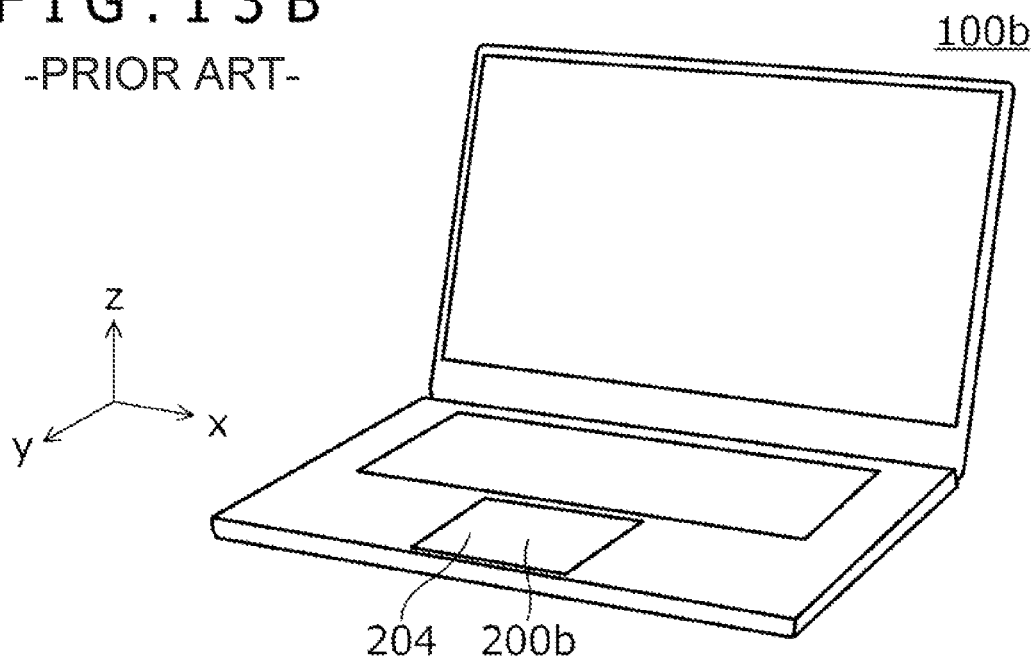
FIG. 13B depicts a notebook computer including a non-discrete type touch pad.

FIGS. 12A and 12B depict states in which the stylus S in FIGS. 11A and 11B is removed, respectively. The base 19 falls into the garage 7*c* when the stylus S is removed from the garage 7*c*. Accordingly, the push button switches 15*a* and 15*b* and the touch screen 3 are displaced downward, but corners of the touch screen 3 are caught on the bottom surface of the recess portion 7*a*. As a result, the base 19 and the push button switches 15a and 15b float in the air. In this state, the touch screen 3 cannot be displaced even if the user uses the finger F or the stylus S to press the touch detection surface 3s. Therefore, the opening 7c, the base 19, and the stylus S provide a garage switch for switching (controlling) between whether or not the touch screen 3 can be displaced, based on whether or not the stylus S is housed in the notebook computer 1.

In the states illustrated in FIGS. 12A and 12B, the push button switches 15a and 15b are not turned on even if the user uses the finger F or the stylus S to press the touch detection surface 3s. The button press state value generated by the button unit 31 is always "0," and the output of the output unit 32 is stopped. Therefore, the garage switch including the garage 7c, the opening 7b, the base 19, and the stylus S functions as a button function stop unit configured to cause the integrated circuit 11 to stop outputting the button press state value according to a setting related to the input operation of the stylus S (that is, the setting is removal of the stylus S from the garage 7c).

As described above, the garage switch including the garage 7c, the opening 7b, the base 19, and the stylus S functions as a button function stop unit according to the touch pad 2 of the present embodiment. This can prevent generation of a click operation not intended by the user when the user uses the stylus S to perform the input operation as in the third embodiment. This can also prevent disturbance to the user's handwriting operation and generation of discontinuous pen pressure values caused by sudden displacement of the touch screen 3.

Although the preferred embodiments of the present disclosure have been described, the present disclosure is not limited to the embodiments, and the present disclosure can be carried out in various modes based on the present disclosure.

For example, although the present disclosure is applied to the non-discrete type touch pad provided on the notebook computer in the examples described in the embodiments, the present disclosure can be widely applied in non-discrete type touch pads.

Although in the embodiments described above the button function stop unit 33 immediately causes the integrated circuit 11 to stop outputting the button press state value when there is a change in the input operation state of the stylus S or there is an alteration in a setting related to the input operation of the stylus S, the button function stop unit 33 may cause the integrated circuit 11 to stop outputting the button press state value after a predetermined time period from the change or the alteration. For example, when the contact state detection unit 36 determines that the stylus S is shifted to the hovering state, the button function stop unit 33 may wait for a predetermined time period from the determination and then cause the integrated circuit 11 to stop outputting the button press state value instead of immediately causing the integrated circuit 11 to stop outputting the button press state value. This can prevent frequent switching between whether the click operation should be valid or invalid.

Although the touch screen 3 is a capacitance touch screen in the embodiments, the present disclosure can also be suitably applied in cases using a pressure-sensitive touch screen.

The invention claimed is:

1. A touch pad configured to receive input operations by objects including a finger and a stylus, the touch pad comprising:
 a touch detection surface that serves as a button and as a position detection region for detecting a position of the stylus; and
 an integrated circuit configured to:
  detect the position of the stylus on the touch detection surface;
  detect a press state of the button; and
  stop outputting a button press state value according to an operation state of the stylus.

2. The touch pad according to claim 1, wherein
 the integrated circuit is configured to stop outputting the button press state value according to the operation state of the stylus indicating that the stylus is used to perform the input operation.

3. The touch pad according to claim 1, wherein
 the touch detection surface is configured to be displaced according to a force applied to the touch detection surface; and
 the touch pad further comprises a displacement suppression system configured to suppress a displacement of the touch detection surface according to the operation state of the stylus.

4. The touch pad according to claim 3, wherein the displacement suppression system is a spacer or an actuator provided beneath the touch detection surface on a side opposite from a side of the touch detection surface that receives the input operations.

5. The touch pad according to claim 3, wherein the displacement suppression system is configured to suppress the displacement of the touch detection surface according to an operation state of a user-operable system of a computer that includes the touch pad.

6. The touch pad according to claim 5, wherein the user-operable system is a garage switch configured to switch between a touch detection surface displaceable state and a touch detection surface non-displaceable state according to whether or not the stylus is housed in the computer.

7. The touch pad according to claim 1, wherein
 the touch detection surface includes a force sensor placed over the touch detection surface; and
 the integrated circuit is configured to stop output of the force sensor to stop outputting the button press state value.

8. The touch pad according to claim 1, wherein
 the integrated circuit is configured to output coordinates of the position of the stylus and the button press state value to a host computer; and
 the integrated circuit is configured to stop outputting the button press state value to the host computer according to the operation state of the stylus.

9. The touch pad according to claim 8, wherein
 the integrated circuit is configured to stop detecting the press state of the button to stop outputting the button press state value to the host computer.

10. The touch pad according to claim 1, further comprising:
 a haptic apparatus configured to provide sensory feedback to a user according to a force applied to the touch detection surface;
 wherein the integrated circuit is configured to cause the haptic apparatus to stop outputting the sensory feedback according to the operation state of the stylus.

11. The touch pad according to claim 1, wherein
 the integrated circuit is configured to determine the operation state of the stylus based on a detection result of a signal from the stylus.

12. The touch pad according to claim 1, further comprising:
a garage switch configured to issue different outputs according to whether or not the stylus is housed in a computer; wherein
the integrated circuit is configured to determine that the stylus is used to perform the input operation responsive to the output of the garage switch indicating that the stylus is not housed in the computer.

13. The touch pad according to claim 1, wherein
the integrated circuit is configured to use a capacitance system to detect the position of the stylus on the touch detection surface; and
the integrated circuit is configured to determine that the stylus is used to perform the input operation on a basis of an area of a contact region detected by the capacitance system.

14. The touch pad according to claim 1, wherein
the integrated circuit is configured to determine whether or not the stylus is in contact with the touch detection surface; and
the integrated circuit is configured to stop outputting the button press state value responsive to a determination that the stylus is in contact with the touch detection surface.

15. The touch pad according to claim 14, wherein
the integrated circuit is configured to determine that the stylus is in contact with the touch detection surface responsive to a pen pressure value included in a signal from the stylus exceeding a threshold value.

16. A computer, comprising:
a touch pad configured to receive input operations by objects including a finger and a stylus, the touch pad including:
a touch detection surface that serves as a button and as a position detection region for detecting a position of the stylus; and
an integrated circuit configured to:
detect the position of the stylus on the touch detection surface;
detect a press state of the button; and
stop outputting a button press state value according to an operation state of the stylus.

17. A method of controlling operation of a touch pad configured to receive input operations by objects including a finger and a stylus, the method comprising:
providing a touch detection surface that serves as a button and as a position detection region for detecting a position of the stylus;
detecting the position of the stylus on the touch detection surface;
detecting a press state of the button; and
stopping outputting a button press state value according to an operation state of the stylus.

18. The method according to claim 17, comprising:
detecting a force value output from a force sensor placed over the touch detection surface; and
stopping outputting the force value to stop outputting the button press state value.

19. The method according to claim 17, comprising:
outputting coordinates of the position of the stylus and the button press state value to a host computer; and
stopping outputting the button press state value to the host computer according to the operation state of the stylus.

20. The method according to claim 19, comprising:
stopping detecting the press state of the button to stop outputting the button press state value to the host computer.

* * * * *